United States Patent [19]

Piereder

[11] 4,060,349
[45] Nov. 29, 1977

[54] CONTINUOUS FLOW, OSCILLATING PISTON MEAT PUMP

[75] Inventor: Ludwig Piereder, Pierrefonds, Canada

[73] Assignee: L. P. Machinery Ltd., Canada

[21] Appl. No.: 731,927

[22] Filed: Oct. 13, 1976

[30] Foreign Application Priority Data

Oct. 14, 1975 United Kingdom ............... 42059/75

[51] Int. Cl.² .................... F04C 21/00; F04B 15/02
[52] U.S. Cl. .................................... 417/482; 417/900
[58] Field of Search .............. 417/481, 482, 509, 900; 222/367, 370, 218

[56] References Cited

U.S. PATENT DOCUMENTS

| 41,091 | 1/1864 | Reid | 417/481 |
|---|---|---|---|
| 1,404,116 | 1/1922 | Hafkesbrink | 417/482 |
| 3,807,908 | 4/1974 | Rossi | 417/481 |
| 3,909,160 | 9/1975 | Sherrod | 417/900 |

Primary Examiner—Carlton R. Croyle
Assistant Examiner—Thomas I. Ross
Attorney, Agent, or Firm—Diller, Brown, Ramik & Wight

[57] ABSTRACT

The invention relates to a continuous flow meat pump which is in the form of a hollow cylindrical chamber enclosed by a top wall, a bottom wall and a side wall. There is an inlet opening in the top wall and an outlet opening in the side wall, and a movable blocking means is disposed over the inlet opening and can be moved to block, alternately, a first portion or a second portion of the inlet opening. A V-shaped wall is included in the chamber to define a V-shaped chamber portion, and the V-shaped chamber portion is disposed underneath the inlet opening. Openings extend through each of the legs of the V-shaped wall, and flap means, freely movable from one leg to another, are included between the legs in the V-shaped chamber portion. The flap means will cover the opening in one leg at any one time. A vane is disposed in the chamber outside of the V-shaped chamber portion and is movable from the outside surface of one leg to the outside surface of the other leg and back again. A vacuum is drawn behind the vane in the direction of travel of the vane. In one stroke of the operation, meat is fed into the chamber between the vane and the leg which the vane is moving away from. When the motion of the vane is reversed, the vane will now be pushing against the meat which had previously been fed into the chamber to push it out through the opening in the leg which the vane is approaching. At the same time, meat will be inserted in that portion of the chamber between the vane and the leg that the vane is moving away from. Thus, in any one stroke, meat is both being fed into the chamber and expelled from the chamber at the same time so that the pumping action is continuous.

7 Claims, 10 Drawing Figures

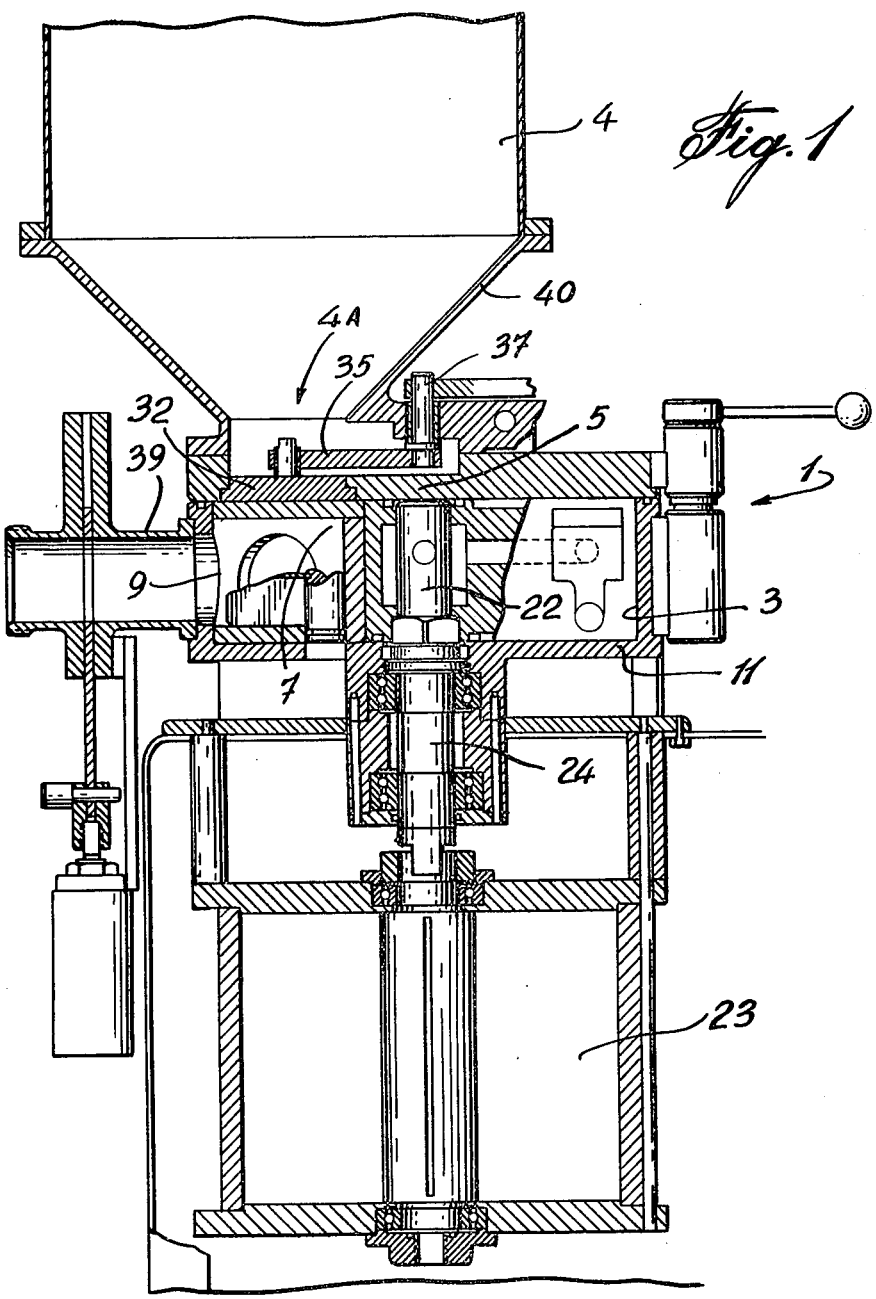

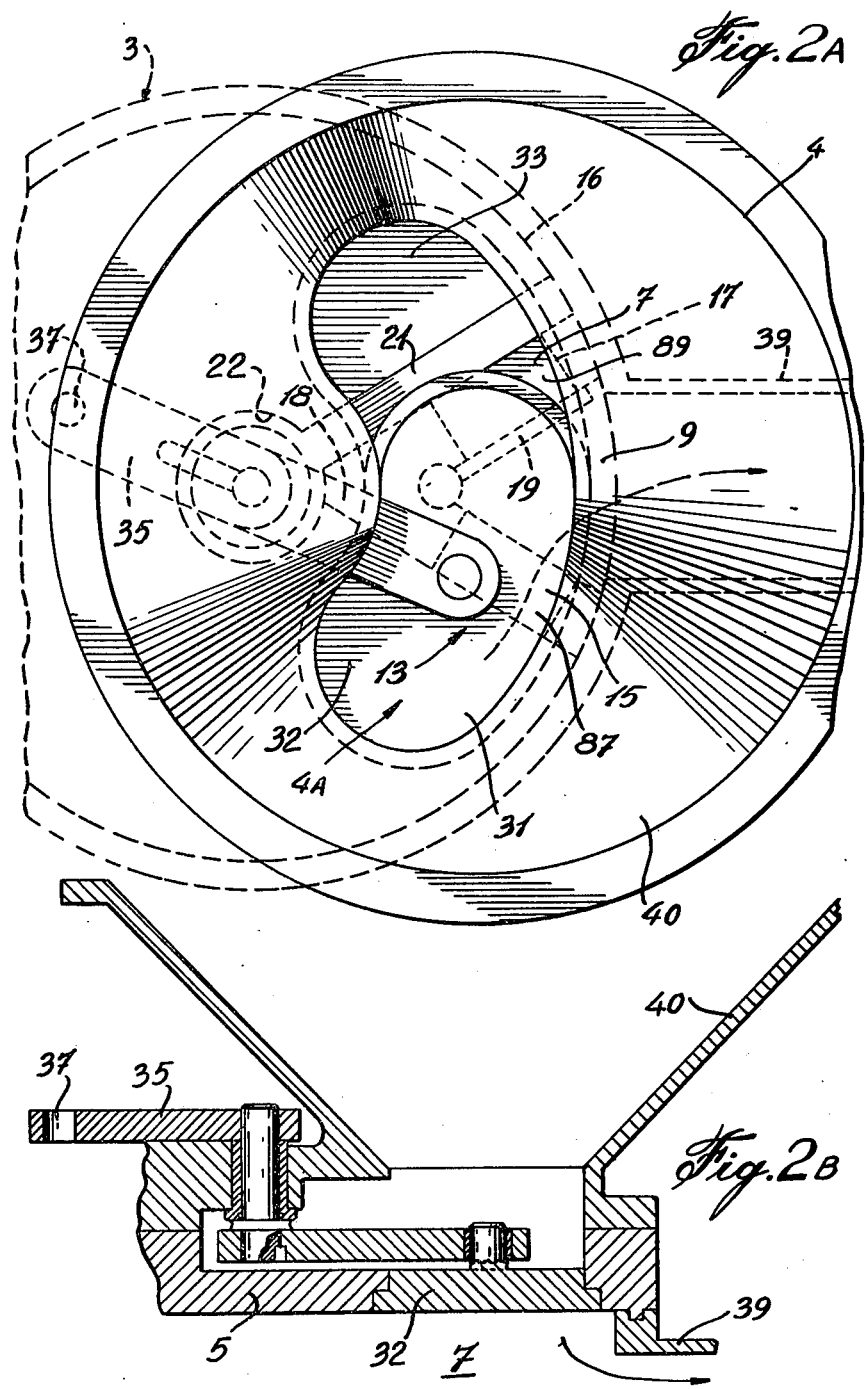

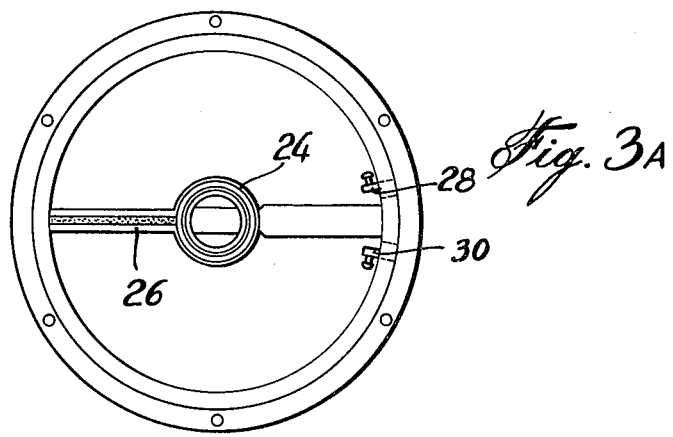
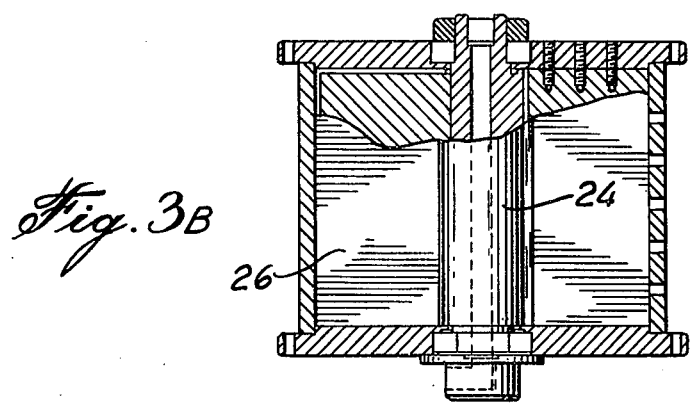
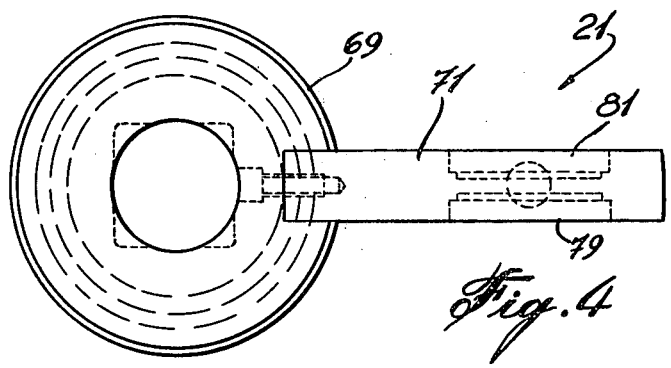

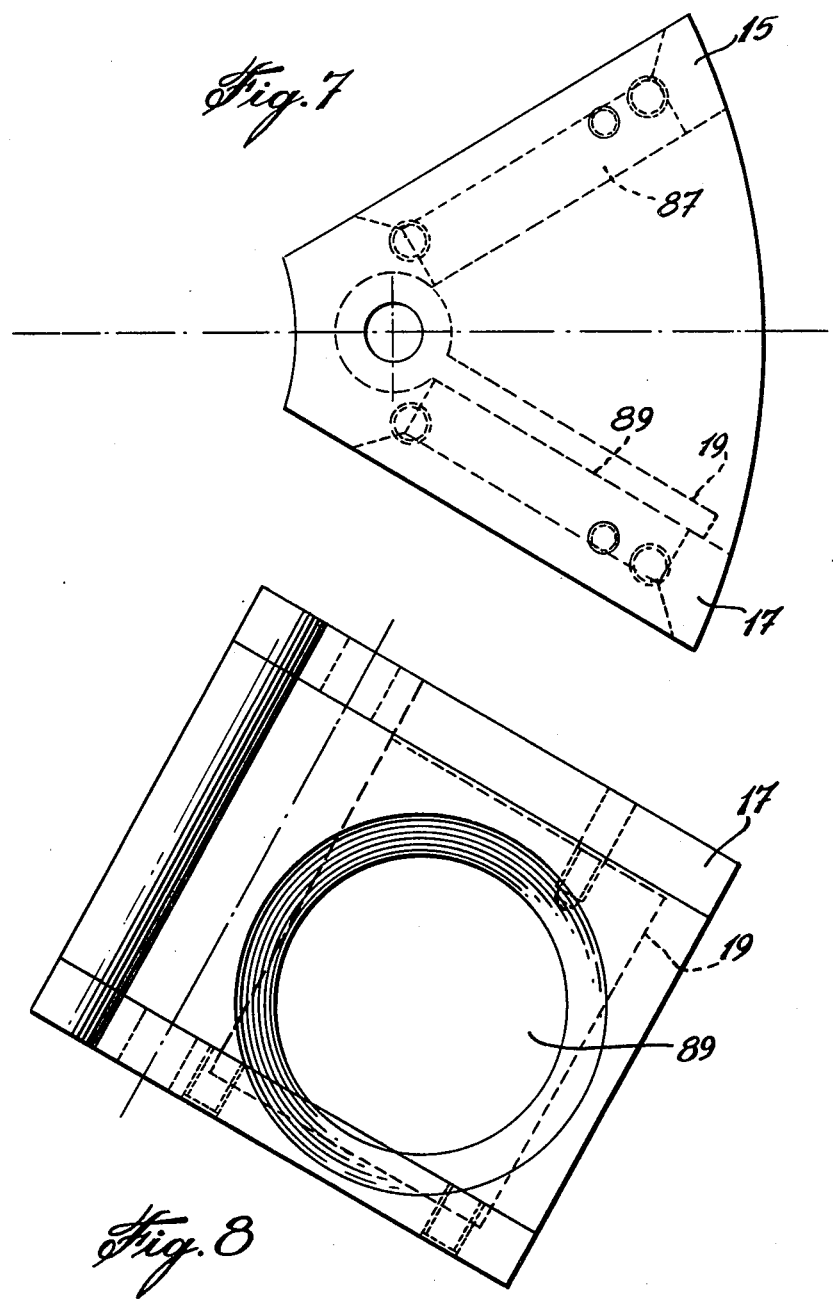

CONTINUOUS FLOW, OSCILLATING PISTON MEAT PUMP

BACKGROUND OF THE INVENTION

1. Field of the Invention

This invention relates to a continuous flow pump for transferring pieces of meat and meat emulsion or any viscose material from a feed means such as a hopper to a packaging means, and to a rotary actuator for driving the pump. The invention also relates to the combination of the flow pump and the actuator.

2. Discussion of the Prior Art

In apparatus for automatically packaging meat products, one of the difficulties has been to provide a meat pump which can handle large pieces of meat. A further difficulty in the prior art is to provide a meat pump which will expel the meat at high pressures. Known apparatus use screws, vanes, or gears for transporting meat in a forward direction, and the size of meat chunks which can be handled by the apparatus is limited. In addition, the meat which is expelled from the apparatus is expelled at relatively low pressures.

It is a further problem in the prior art to provide a meat pump which can handle large pieces of meat and which operate on a substantially continuous basis.

SUMMARY OF THE INVENTION

It is therefore an object of the invention to provide a substantially continuous meat pump which can handle large pieces of meat without reducing them in size.

It is a further object of the invention to provide such a pump which will expel meat at high pressures.

It is a still further object of the invention to provide a rotary actuator for use in association with the inventive pump.

It is a further object of the invention to provide a combination of a pump and a rotary actuator.

These and other objects are obtained in accordance with the invention which comprises: a continuous flow meat pump comprising: a hollow chamber enclosed by a top wall, a bottom wall and a side wall; an inlet opening in said top wall and an outlet opening in said side wall; blocking means, adjacent said inlet opening, for alternately blocking a first portion of said inlet opening when said blocking means is in a first position, and a second portion of said inlet opening when said blocking means is in a second position; means for moving the blocking means from the first position to the second position and from the second position to the first position; a V-shaped wall, having a right-hand leg and a left-hand leg, within said chamber to define a V-shaped chamber portion within said chamber; said V-shaped wall having its legs, spaced from each other at either side of the outlet opening in the side wall of the chamber, extending into the chamber towards each other and meeting at an apex disposed in the chamber and spaced from the side wall thereof; each leg being equal in height to the height of the chamber; flap means between said legs in the V-shaped chamber portion and being freely movable from one leg to the other; an opening extending through each one of said legs; said flap means being disposed to cover the opening in the wall against which it is adjacent; a vane disposed in said chamber and outside said V-shaped chamber portion and being movable from one position, adjacent said right-hand leg, to a second position adjacent the said left-hand leg, and from the second position to the first position; means for moving said vane from the first position to the second position and from the second position to the first position; said vane extending from the center of the chamber to the side wall thereof; and means for providing a space of reduced pressure in said chamber behind said vane in the direction of travel thereof.

Preferably, the chamber is cylindrical, and the means for moving the vane comprises means for rotating the vane about the central axis of the chamber.

Preferably, said means for rotating said vane comprises a rotary actuator having a first shaft which is connected to a second shaft for said vane, whereby rotation of said first shaft causes like rotation of said vane.

Said rotary actuator can comprise a radially extending member extending from said first shaft.

BRIEF DESCRIPTION OF THE DRAWINGS

The invention will be better understood by an examination of the following disclosure together with the accompanying drawings in which:

FIG. 1 is a cross-section through a packaging apparatus including a hopper, the inventive meat pump and the inventive rotary actuator;

FIG. 2A is a top view of FIG. 1 showing the top wall of the pump and the opening therein and showing also the means for blocking portions of the opening, and showing also the V-shaped chamber portion, the flap means in the V-shaped chamber, and the vane in the meat chamber;

FIG. 2B is a side section of the hopper dispenser;

FIGS. 3A and 3B are top and side views respectively of the rotary actuator;

FIG. 4 is a top view of the rotatable vane;

FIG. 7 is a top view of the V-shaped wall; and

FIG. 8 is a side view of FIG. 7.

DETAILED DESCRIPTION OF THE DRAWINGS

Figure 5:
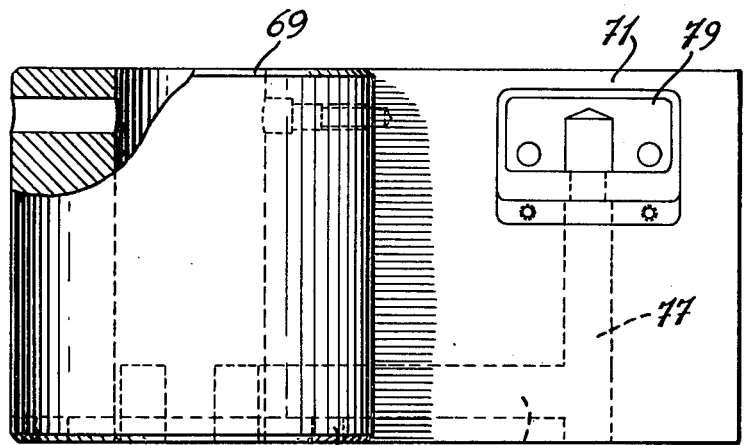
FIG. 5 is a side view of FIG. 4.

Referring to FIGS. 1, 2A and 2B, the apparatus includes a pump indicated generally at 1 comprising a cylindrical chamber 3. A cover 5 defines the top wall of the cylindrical chamber 3 adjacent the bottom 4A of hopper 4. The top wall includes an opening 7, which may be kidney shaped; and an opening 9 is included in the side wall of the cylindrical chamber. The opening 7 constitutes the input, and the opening 9 constitutes the output of the pump. The bottom of the cylindrical chamber is defined by the bottom wall 11 of the pump.

Within the chamber 3 is a V-shaped wall 13 (see FIG. 2A) having legs 15 and 17 and forming between them a V-shaped chamber portion. The legs are equal in height to the height of the chamber, and each leg extends radially from the side wall 16 of the chamber towards the center of the chamber to form the apex 18 of the V. As can be seen, the free ends of the legs are spaced from each other on the side wall on either side of the opening 9.

A freely rotatable flap means 19 is disposed within the V of the V-shaped wall. The purpose of the flap means will be discussed below.

A rotatable vane means 21 is mounted to rotate in the chamber on the outside of the V-shaped wall. It moves in a counterclockwise direction, driven by the shaft 22, from the outside surface of leg 17 to the outside surface of leg 15, and in a clockwise direction from 15 to 17.

The vane is described in greater detail below with reference to FIGS. 4, 5 and 6.

Below the chamber, as best seen in FIG. 1, is a rotary actuator 23 which provides the motive force for driving the shaft 22 as will be explained below. As can be seen in FIGS. 1 and 3, the rotary actuator comprises a central shaft 24 which is preferably driven by hydraulic means as well known in the art. Extending from the shaft to the inner surface of the peripheral wall of the rotary actuator is a radially extending member 26. Switches 28 and 30 define the end positions of rotary motion of the member 26 in the clockwise and counterclockwise directions respectively. As can be seen in FIG. 1, shafts 24 and 22 are connected so that shaft 22 will be driven with shaft 24. Vane 21 and member 26 are arranged such that vane 21 follows the motion of member 26.

Returning now to FIG. 2A, as can be seen, the opening 7 is disposed above the V-shaped chamber portion formed by the V-shaped legs. The opening 7 extends beyond the outside surface of both the V-shaped legs to include a right-hand portion 31 to the right-hand side of the right-hand leg 15, and a left-hand portion 33 to the left-hand side of the left-hand leg 17. A blocking plate 32 is disposed in the opening 7 and will block off a portion of the opening depending on the position of the blocking plate. In the right-hand position, as shown in FIG. 2A, the blocking plate blocks the central portion of the opening (over the V-shaped chamber portion) and the right-hand portion of the opening. When the blocking plate is in the left-hand position, i.e. the left-hand edge of the blocking plate is contiguous with the left-hand end of the opening 7, it blocks the central portion of the opening as well as the left-hand portion 33 thereof.

The blocking plate 32 is swingable by lever 35, about a shaft 37, to move from its left-hand to its righthand position and vice-versa. The lever is driven by means well known in the art. As can be seen in FIG. 2A, when the blocking plate is on the right-hand side, then the interior of the chamber to the left of leg 17 is in communication with the interior of the hopper through portion 33 of opening 7. In a likewise fashion, when the blocking plate is on the left-hand side of the opening, then the unblocked portion 31 of the opening 7 will provide communication between the interior of the hopper and the interior of the pump chamber to the right of leg 15. Thus, the portion of the chamber with which the hopper is in communication can be altered by moving the blocking plate 32.

Mounted adjacent to the opening 9 is a pipe 39 which conveys meat from the pump to a packaging assembly not shown.

The product is fed to the pump from hopper means 4 which includes a bottom dispenser 40 which is fixed to the pump in such a manner that the bottom dispenser covers the entire area of the opening 7. Thus, meat in the hopper is drawn in through the opening 7 regardless of the position of the blocking plate 32.

The vane 21 will now be further described with reference to FIGS. 4, 5 and 6. As can be seen in these figures, the vane comprises a hub portion 69 and a radially extending portion 71. The free end of portion 71 extends substantially to the side wall of the chamber 3 as seen in FIG. 2A. The height of the vane is substantially equal to the height of the chamber but with enough clearance to permit rotation in the chamber.

Figure 6:
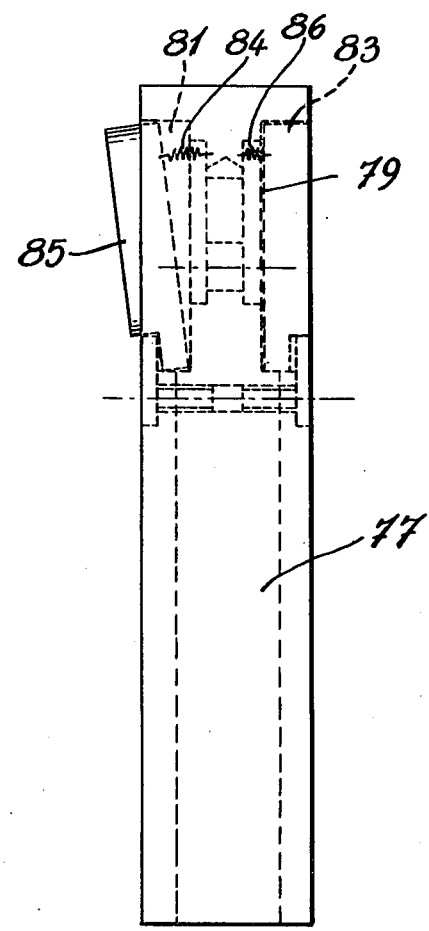
FIG. 6 is an end view of FIG. 5.

Circular groove 73, disposed in the bottom end of the hub portion, communicates with horizontally extending bore 75 in the radially extending portion 71 as is seen in FIG. 5. Bore 75 communicates with vertically extending bore 77, which, in turn, communicates with windows 79 and 81 disposed respectively in each side wall of the radially extending portion 71. Windows 79 and 81 comprise freely movable flap means 83 and 85 respectively which are pivoted for movement about the bottom ends thereof. In addition, springs 84 and 86 provide a force for biasing flaps 81 and 83 respectively in their outward directions. Groove 73 is connected to a source of vacuum so that a vacuum can be drawn in the chamber 3 through groove 73, bores 75 and 77 and one of the windows 79 or 81 as will be discussed below.

The V-shaped wall 13 will now be further described with reference to FIGS. 7 and 8. As can be seen in these figures, the legs 15 and 17 comprise openings 87 and 89 respectively passing completely through the legs. The flap means 19, shown in FIG. 2A, is large enough to completely cover the openings of an adjacent leg for purposes discussed below.

In operation, the apparatus works as follows:

For purposes of the description, we will assume starting conditions with the chamber completely empty, with the vane 21 adjacent leg 17, and with the left-hand portion 33 of opening 7 of the top cover unblocked as shown in FIG. 2A. In general, the apparatus is adjusted such that, when the vane 21 is adjacent leg 17 and about to move in the counterclockwise direction towards leg 15, the blocking plate 32 will be in the right hand position as shown in FIG. 2A. On the other hand, when the vane 21 is adjacent leg 15 and about to move in the clockwise direction towards leg 17, the blocking plate 32 will be moved to its left-hand position over the leg 17 by movement of the lever 35, so that portion 33 is unblocked.

Control over the motion and direction of motion of the vane 19 is exercised by the switches 28 and 30 (FIG. 3A) of the actuator 23 as follows: as above-mentioned, the vane 19 will follow, in direction and speed, the movement of the member 26. When the member 26 is moving in a counterclockwise direction, it will eventually make contact with the switch 30. The switch 30 is connected with the means for driving the actuator, and will cause this means to change the direction of operation thereof. Thus, after the switch 30 has been contacted, the member 26 will be driven in a clockwise direction. Accordingly, the vane 19 will also be driven in a clockwise direction. Moving in the clockwise direction, the member 26 will eventually contact the switch 28. This will again change the direction of operation of the means for driving the actuator so that the member 26 will now be driven, once again, in a counterclockwise direction. Accordingly, the vane 19 will also be driven in the counterclockwise direction.

The switches 28 and 30 also provide control for the timing and direction of movement of the blocking plate 32. As above mentioned, when the vane 19 is moving in a counterclockwise direction, the blocking plate 32 is in its right-hand position as shown in FIG. 2A. When the member 26 actuates the switch 30, the means for swinging the blocking plate 32 will also be actuated to swing the blocking plate 32 to its left-hand position to block the central portion and left-hand portion 33 of the opening 7. The blocking plate will remain in this position as long as the member 26, and consequently also the vane 21, are moving in a clockwise direction. When the member 26 actuates the switch 28, the means for swinging the blocking plate will once again be actuated to swing the blocking plate into its right-hand position as shown in FIG. 2A.

Meat in the hopper will fall into the interior of the chamber 3 through the unblocked portion 33 of opening 7 even before the vane 21 begins to rotate, and this meat will be disposed to the left of the vane 21. When the vane 21 begins to rotate in the counterclockwise direction, the flap 85 in the left-hand window 81 will be forced into the window 81 by force of pressure due to the direction of travel of the vane as well as the pressure of any meat in advance of the vane in the direction of travel thereof.

The flap 83, in window 79, which is on the rearward side of the vane in the direction of travel thereof, will pivot out of the window, due to the force of spring 86, to leave this window open.

As the window 79 communicates with a vacuum source through bores 77, 75 and circular groove 73, as above-described, a vacuum will be pulled in the chamber behind the vane in the direction of travel of the vane. Meat which has fallen into the chamber will be displaced in the direction of the vacuum to fill the vacuum, so that all the meat will be displaced in the direction of the rear side of the vane in the direction of travel thereof. Meat is continuously entering the chamber below the opening 7 as the meat already in the chamber follows the vane 21.

As can be seen, as the meat is constantly moving in the direction of a vacuum and filling an evacuated space, there is no opportunity for air or air bubbles to enter into the meat, and the meat is kept air-free during the pumping process. Further, when vane 21 is adjacent leg 15, the entire chamber between leg 17 and vane 21 will be filled with the air-free meat.

When vane 21 is adjacent leg 15 (26 is in contact with switch 30), plate 32 is rotated in the counterclockwise direction until it blocks portion 33 and the central portion of opening 7 to leave the portion 31 over leg 15 unblocked as above-described. Member 26, and thus vane 21, is then caused to rotate in a clockwise direction towards leg 17. With the vane rotating in the clockwise direction, flap 88 will be forced into window 79 to close this window, while flap 85 will pivot in window 81 to open window 81 as shown in FIG. 6. As can be seen, the closed window is always on the forward side of the vane in the direction of travel thereof, while the open window is always on the rearward side of the vane in the direction of travel thereof. Thus, as the vane rotates in the clockwise direction, the portion of the chamber between the rearward side of the vane and the leg of the V adjacent the rearward side of the vane will fill up with air-free meat from the hopper.

Meanwhile, the meat in the chamber at the forward side of the vane is pushed by the vane, as it rotates, towards leg 17 and thence through the opening 89 in leg 17. As the flap means 19 is freely rotatable, the force of the meat coming through the opening will push the flap in the direction of leg 15 where it will cover opening 87 in leg 15 to prevent meat coming through opening 89 from entering the other side of the chamber through the opening 87.

With opening 87 blocked, the only escape route for the meat being forced into the V-shaped chamber is through opening 9 in the side wall of the chamber. Opening 9 is in communication with pipe 39, which communicates in turn with the packaging assembly by the action of the pump for disposition.

Again, vane 21 will rotate in a clockwise direction until it is adjacent leg 17. At this point, the chamber portion between the rear side of the vane in its direction of travel and the outside surface of leg 15 will be filled with air-free meat, and the meat which was in the chamber will have been expelled through the opening 9 to the packaging assembly.

When vane 21 is adjacent leg 17, plate 32 will rotate in a clockwise direction until it is in the position as shown in FIG. 1, and vane 21 will begin to rotate in a counterclockwise direction.

As can be seen, the meat pump in accordance with the invention can handle relatively large chunks of meat because the pump does not use any screw type device or any chamber which reduces the size to propel it forward. In addition, because a positive force is being applied directly to the meat, the meat will be expelled from the pump with a relatively large pressure.

As can also be seen, the pump executes both the filling and expelling functions in the same stroke. Further, the pumping is substantially continuous and without breaks because the pump is being filled at the same time that it is being emptied.

Although only one embodiment has been described in the foregoing, this was for the purpose of illustrating, but not limiting the invention. Various modifications which will come readily to the mind of one skilled in the art, are within the scope of the invention as defined in the appended claims.

I claim:

1. A continuous flow pump comprising:
   a hollow chamber enclosed by a top wall, a bottom wall and a side wall;
   an inlet opening in said top wall and an outlet opening in said side wall;
   blocking means, adjacent said inlet opening, for alternately blocking a first portion of said inlet opening when said blocking means is in a first position, and a second portion of said inlet opening when said blocking means is in a second position;
   means for moving the blocking means from the first position to the second position and from the second position to the first position;
   a V-shaped wall, having a right-hand leg and a left-hand leg, within said chamber to define a V-shaped chamber portion within said chamber;
   said V-shaped wall having its legs, spaced from each other at either side of the outlet opening in the side wall of the chamber, extending into the chamber towards each other and meeting at an apex disposed in the chamber and spaced from the side wall thereof;
   each leg being equal in height to the height of the chamber;
   flap means between said legs in the V-shaped chamber portion and being freely movable from one leg to the other;
   an opening extending through each one of said legs;
   said flap means being disposed to cover the opening in the wall against which it is adjacent;
   a vane disposed in said chamber and outside said V-shaped chamber portion and being movable from one position, adjacent said right-hand leg, to a second position adjacent the said left-hand leg, and from the second position to the first position;

means for moving said vane from the first position to the second position and from the second position to the first position;

said vane extending from the center of the chamber to the side wall thereof; and means for providing a space of reduced pressure in said chamber behind said vane in the direction of travel thereof.

2. A continuous flow pump as defined in claim 1 wherein said chamber is cylindrical and wherein said means for moving said vane comprises means for rotating said vane about the central axis of said chamber.

3. A continuous flow pump as defined in claim 1 wherein said inlet opening is disposed over the V-shaped chamber portion and extends beyond the V-shaped chamber portion to comprise a left-hand portion, between the left-hand leg and the left-hand end of said opening, a central portion over the V-shaped chamber portion, and a right-hand portion between the right-hand leg and the right-hand edge of the opening;

whereby, when said blocking means is in said first position, it will be blocking said left-hand portion and said central portion, and when said blocking means is in its second position, it will be blocking said right-hand portion and said central portion.

4. A continuous flow pump as defined in claim 3 wherein, when said blocking means is in its first position, said means for moving said vane is moving said vane from its first position to its second position, and when said blocking means is in its second position, said means for moving said vane is moving said vane from its second position to its first position.

5. A continuous flow pump as defined in claim 1 wherein said vane member comprises window means on either side thereof;

a source of vacuum connected, through said vane, to said window means; and means freely pivotable in each of said windows which, when in a locked position, prevent communication between said source of vacuum and the interior of said chamber, and, when in an open position, permit communication between said source of vacuum and the interior of said chamber;

means biasing said means freely pivotable to their open position;

wherein, when said vane is in motion, the means freely pivotable in the window on the forward side of said vane will be in the locked position, and the means freely pivotable in the window on the rearward side of said vane will be in its open position to thereby pull a vacuum in said chamber on the rearward side of said vane.

6. A continuous flow pump as defined in claim 1 wherein said vane comprises a rotary actuator having a first shaft which is connected to a second shaft for said vane, whereby rotation of said first shaft causes rotation of said vane.

7. A continuous flow pump as defined in claim 6 wherein said rotary actuator comprises a radially extending member extending from said first shaft.

* * * * *